Oct. 31, 1939.   P. SORDOILLET   2,177,814
MEASURING AND COMPUTING DEVICE
Filed March 16, 1937   5 Sheets-Sheet 1
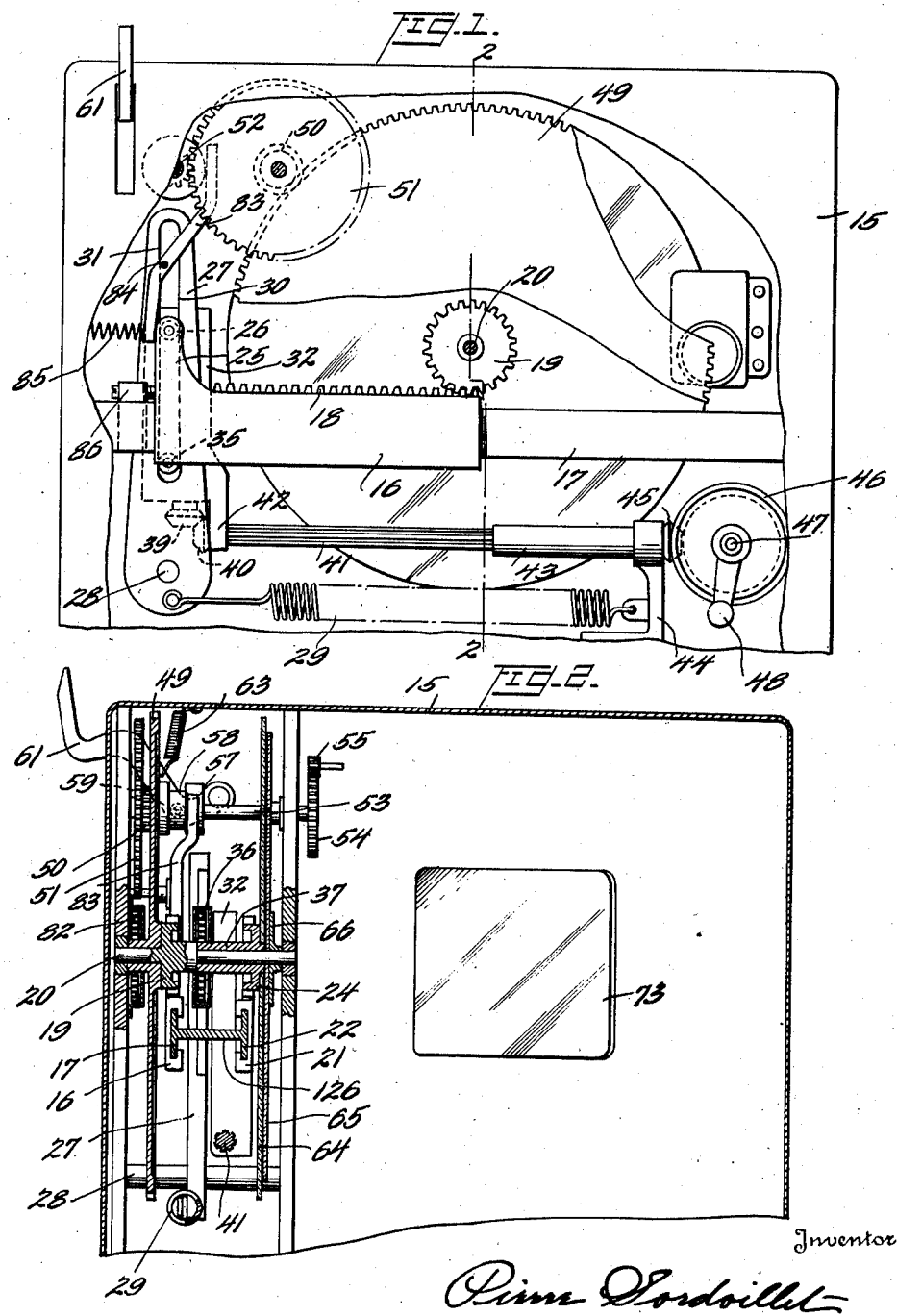

Oct. 31, 1939.　　　　P. SORDOILLET　　　　2,177,814
MEASURING AND COMPUTING DEVICE
Filed March 16, 1937　　　5 Sheets-Sheet 2
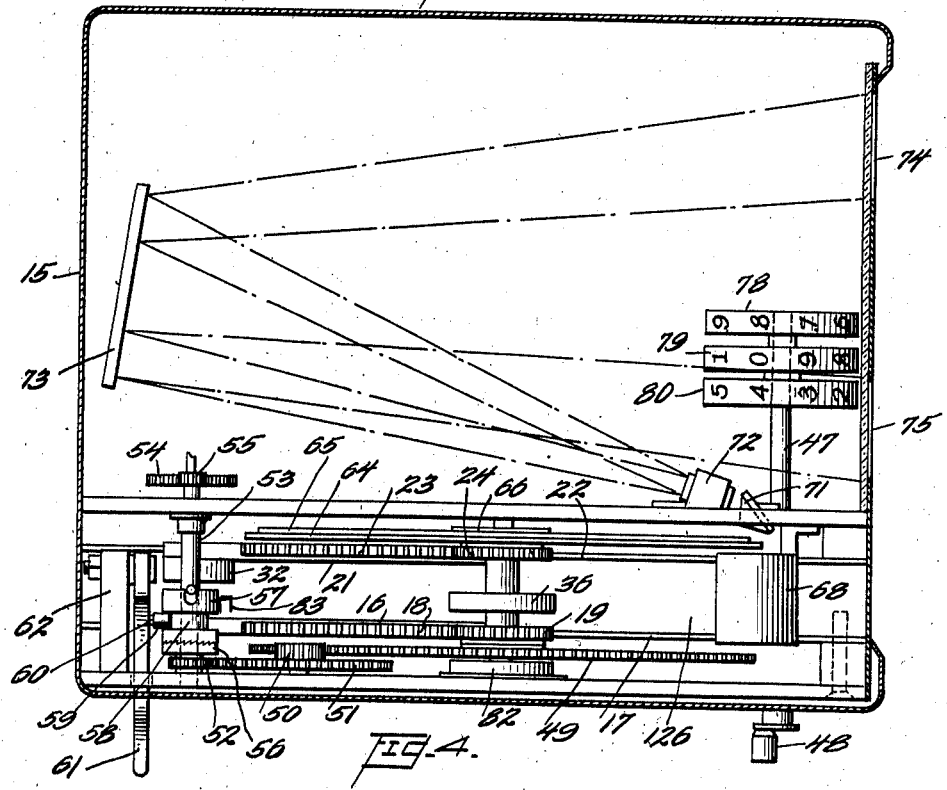
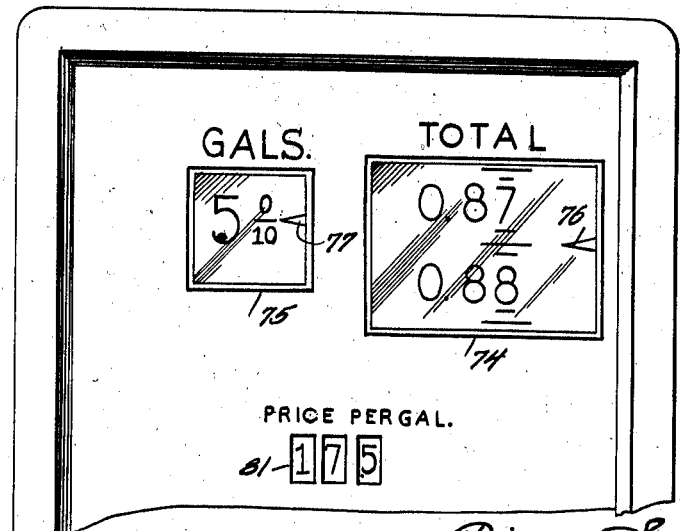
Inventor
Pierre Sordoillet
By Watson, Coit, Morse & Grindle
Attorney

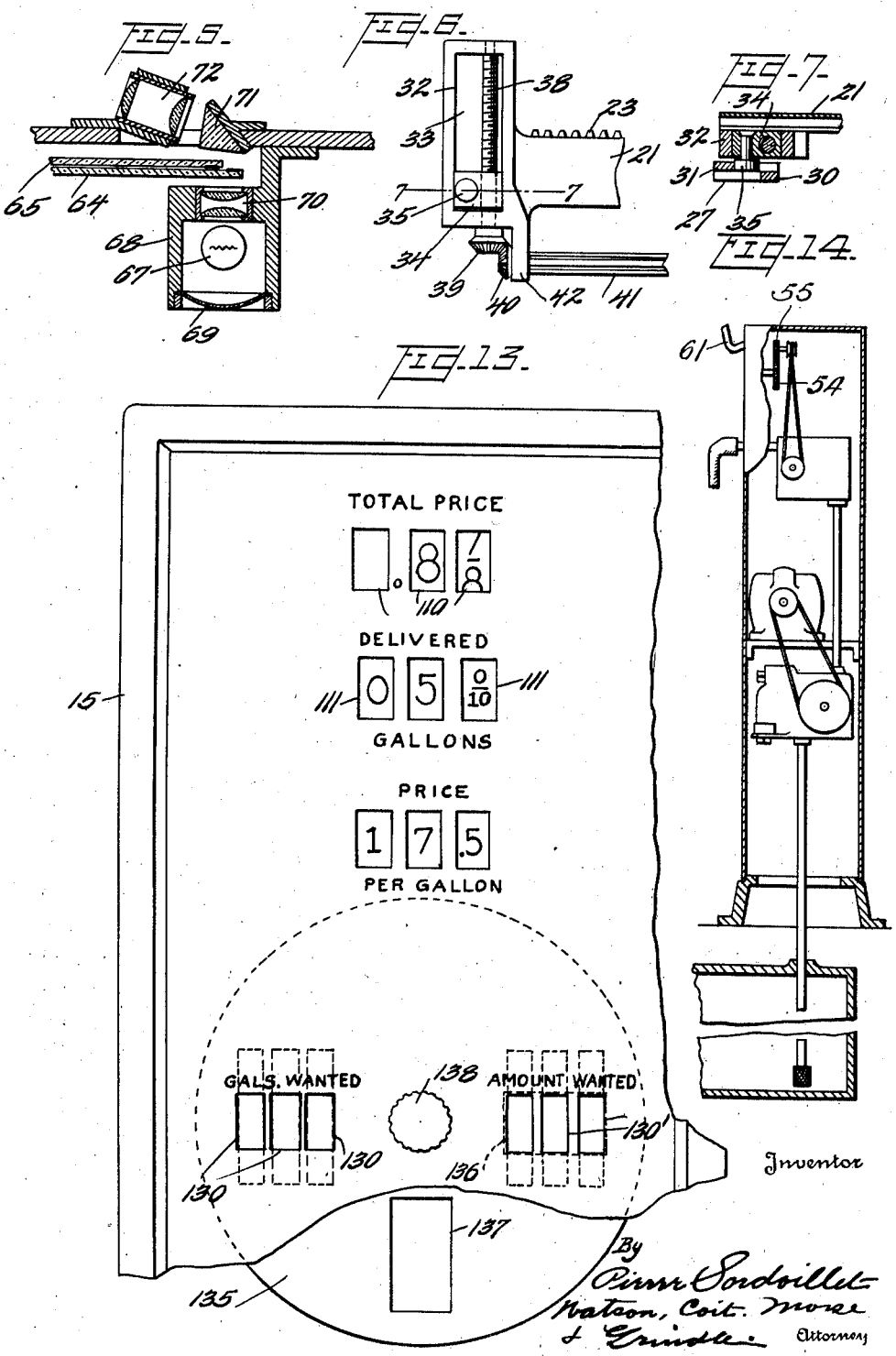

Oct. 31, 1939.                P. SORDOILLET                2,177,814
                        MEASURING AND COMPUTING DEVICE
                        Filed March 16, 1937      5 Sheets-Sheet 4
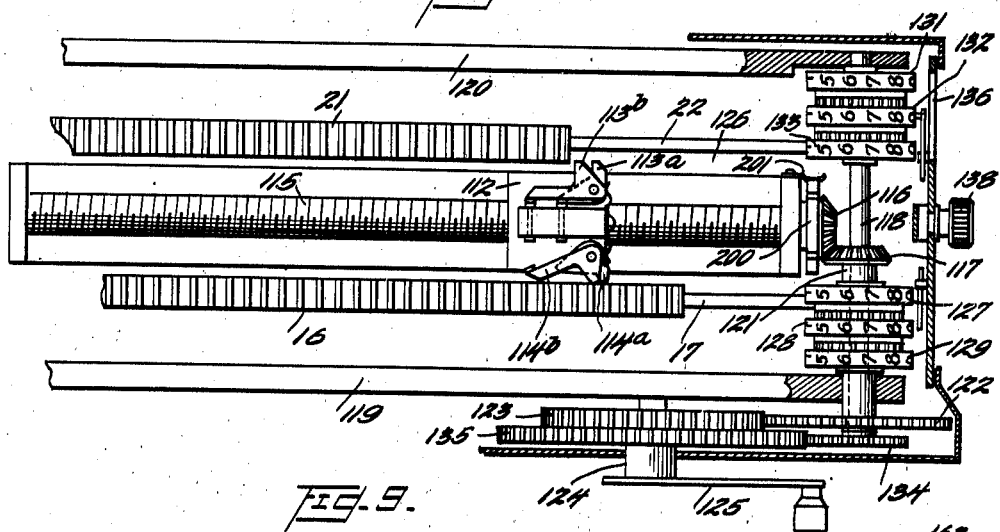
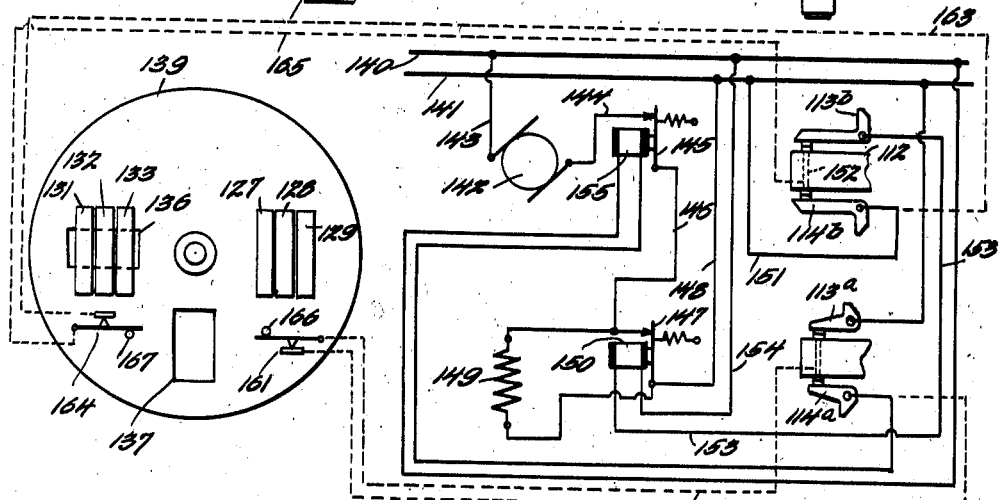

Patented Oct. 31, 1939

2,177,814

UNITED STATES PATENT OFFICE 2,177,814

MEASURING AND COMPUTING DEVICE

Pierre Sordoillet, Paris, France

Application March 16, 1937, Serial No. 131,245
In Belgium March 19, 1936

18 Claims. (Cl. 221—95)

This invention relates to computing devices, and more particularly to a device for multiplying or dividing a given factor by a second factor and indicating visually the product or quotient of the operation.

An important feature of the invention resides in the means provided for adjusting the mechanism in accordance with variations in the value of the factor which is to be multiplied or divided by the other factor.

Devices of the nature specified find application in the field of computing dispensing devices, such as volumetric pumps and the like, computing scales, and many other applications in which frequent computations, capable of being carried out mechanically, are involved. In the present instance, the invention will be described and illustrated particularly in connection with a computing dispensing device, such as a gasoline dispensing pump, but it is to be understood that no limitation of the invention is thereby intended, the essential features of the invention being obviously useful in many other connections.

One object of the present invention is the provision of a computing device of the nature described, in which the mechanism may be adjusted in accordance with variations in the value of a factor in the computing operation, such adjustment being capable of accomplishment with absolute accuracy and with a minimum of inconvenience.

Another object is the provision of a computing device in which the product or quotient of the operation is indicated visually in a manner so as to be easily read by anyone interested.

A further object is the provision of a device of the character mentioned, to be employed in connection with a dispensing device, in which the quantity of goods delivered, the unit price, and the total price of the goods delivered, will be visually indicated to the customer, during and at the end of the operation.

Another object is the provision of means, in a device of the character described, whereby the operation of a dispensing device may be automatically interrupted when the desired quantity of goods has been dispensed or when goods of a predetermined total price have been dispensed.

More specifically, in connection with the application of the device of the present invention to a dispensing device such as a gasoline dispensing pump, it is an object of the present invention to provide means whereby the mechanism may be adjusted in accordance with variations in the unit price or gallon price of the gasoline, such adjustment being capable of attainment very quickly and with a minimum of inconvenience.

Other and further objects, features and advantages of the present invention will be apparent to one skilled in the art from the following description in connection with the accompanying drawings, in which, Figure 1 is an elevational view of a device constructed in accordance with the present invention, the outer casing being broken away to show the internal mechanism;

Figure 2 is a vertical section on line 2—2 of Figure 1;

Figure 3 is a plan view of the device of Figures 1 and 2;

Figure 4 is an elevation of one side of the outer casing of the device illustrating the screens or windows in which the unit price, quantity delivered, and total price are exhibited;

Figures 5 and 6 are enlarged details of certain of the mechanism illustrated in Figures 1, 2 and 3;

Figure 7 is a section on line 7—7 of Figure 6;

Figure 8 is a plan view of a modified form of the invention in which the quantity to be dispensed, or the total value of the goods to be dispensed may be predetermined and the operation of the dispensing device automatically interrupted in accordance with such predetermination;

Figure 9 illustrates diagrammatically the electrical circuits employed in the device of Figure 8;

Figure 12 is an enlarged detailed view of a portion of the mechanism of Figures 10 and 11;

Figure 10:
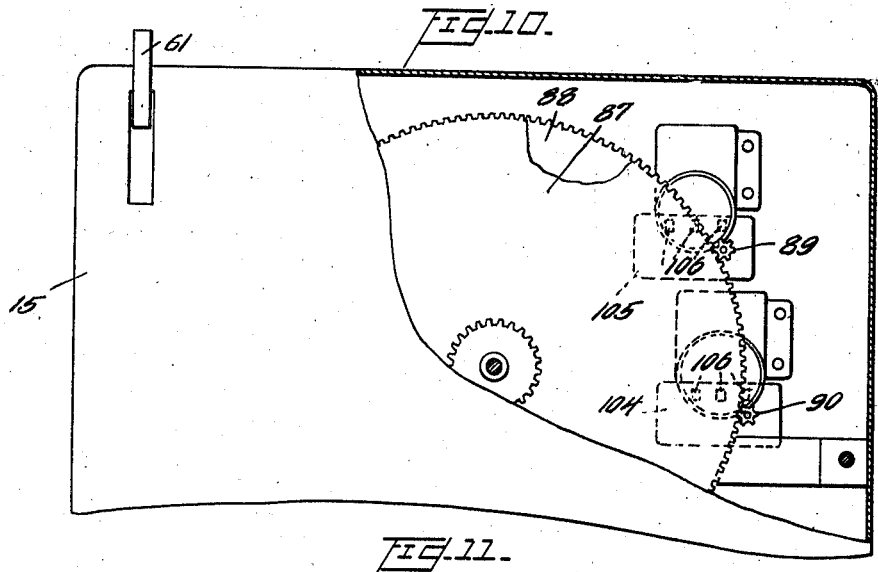
Figure 10 is an elevation illustrating another modified form of the present invention.

Figure 13 is an elevation of one side of the outer casing of a device constructed in accordance with Figures 8—12, inclusive, and illustrating the screens or windows provided for indicating the various quantities which the device is capable of registering or computing; and Figure 14 is an elevation of a dispensing apparatus in accordance with the present invention, the casing being broken away to illustrate the interior parts.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

For convenience of illustration, the computing device of the present invention is shown and described in connection with a liquid dispensing device such as the familiar gasoline dispensing pump. In connection with such devices, it is desirable to exhibit, in a manner easily readable by the customer, indications of the price per gallon of fuel, the quantity of fuel dispensed, and the total price of the fuel dispensed. A computing device capable of computing the total price in accordance with the unit price and the quantity dispensed and of visually indicating the several quantities mentioned, is illustrated in Figures 1-7, inclusive.

Referring to Figure 1, the numeral 15 designates a casing of suitable shape, disposed in conjunction with the dispensing mechanism and adapted to enclose the computing mechanism to be hereinafter described. The computing mechanism includes a carriage 16 slidably mounted upon a guide 17, which is secured in any suitable manner within the casing 15. The carriage 16 is provided with a toothed rack 18 for engagement with a pinion 19 which is secured upon a shaft 20. A second carriage 21 (Figs. 2 and 3) is slidably mounted upon a guide 22, which may be formed integral with the guide 17, as illustrated in Figure 2, with an intervening web portion 126. The carriage 21 is provided with a toothed rack 23 for engagement with the pinion 24 loosely mounted upon the shaft 20.

The carriage 16 is formed with an up-standing projection 25, on which is provided a laterally projecting stud carrying a roller 26 for engagement with a slotted member 27. The member 27 is pivotally mounted on a shaft 28, and is yieldingly urged in a counterclockwise direction by a spring 29. The slotted member 27 is formed with its respective arms or tracks 30 and 31 offset laterally so as to lie in separate but contiguous vertical planes. The roller 26 engages the arm or track 30 of member 27 causing oscillatory movements of the latter in accordance with the reciprocal movements of the carriage 16, the arm or track 30 being maintained in constant engagement with the roller 26 by the action of the spring 29.

The carriage 21 is formed with an up-standing portion 32 defining an open guideway 33 in which is adjustably mounted a block 34 provided with a laterally projecting stud carrying a roller 35, similar to the roller 26. The roller 35 is adapted to engage the arm 31 of the slotted member 27, whereby the horizontal movements of the carriage 21 are controlled in accordance with the oscillations of the member 27 and hence are controlled by the horizontal movements of the carriage 16. The carriage 21 is at all times urged toward the left hand position (in Fig. 1) by means of a spiral spring 36 associated with a sleeve 37 formed integral with the pinion 24, thus maintaining the roller 35 at all times in engagement with the arm 31.

The block 34 carrying the roller 35 is adjustable vertically within the guide way 33 by means of a screw 38 rotatably mounted in the upstanding portion 32 of the carriage 21, as illustrated in Figures 6 and 7. The screw 38 is provided at its lower end with a bevel gear 39 which engages a similar bevel gear 40. The latter is mounted upon the end of a splined shaft 41 which latter slidably engages a downwardly extending projection 42 of the carriage 21. The shaft 41 has splined engagement with a sleeve 43 journalled in a bracket 44, which may be mounted within the casing in any suitable manner. A bevel gear 45 secured upon the outer end of the sleeve 43 or formed integral therewith, meshes with a bevel gear 46, which latter is secured upon a shaft 47 which penetrates the casing 15 and is provided externally thereof with a crank 48.

From the foregoing description, it is obvious that by turning the crank 48, the screw 38 may be rotated and the block 34 adjusted vertically within the guide way 33. Such vertical adjustment is intended to be made in accordance with variations in the unit price of the commodity being dispensed, and affects the operation of the device in a manner to be hereinafter described.

Rotation is imparted to the shaft 20, through a large gear 49 secured thereon, by means of a gear train comprising a pinion 50, gear 51 and pinion 52, the latter being loosely mounted upon a shaft 53 which is driven from any suitable member of the dispensing apparatus. For example, the shaft 53 may be provided at its inner end with a gear 54 adapted to mesh with a pinion 55 driven from the dispensing apparatus, as illustrated in Figure 14. The several gears of the train are chosen so that the shaft 20 may rotate with a speed bearing such relation to the speed at which the commodity in question is dispensed that the computing and registering apparatus will function to accurately register the quantity of liquid dispensed and, accordingly, the total price to be paid. Obviously, the number and proportions of the gears chosen will depend upon the characteristics of the dispensing apparatus, and the choice and disposition of the gears is a matter of design which will be within the ability of one skilled in the art to which the present invention appertains.

Loosely mounted upon the shaft 53 is a clutch comprising a member 56 (Fig. 3) secured to or formed integral with the pinion 52, and a slidable member 57, which has a pin and slot engagement with the shaft 53. The latter member is formed with an annular groove 58, adapted to engage with a roller 59 carried on a pin 60 projecting laterally from a hook member 61. The latter is pivotally carried by a bracket 62 and extends outside the casing 15. The outer portion of the member 61 is formed with a hook-like depression adapted to receive and support the nozzle of the usual dispensing hose associated with a dispensing pump of the type under consideration. By virtue of the engagement of the roller 59 within the groove 58 of the sliding clutch member 57, it is obvious that the engagement and disengagement of the clutch is controlled in accordance with the movements of the member 61. The latter is constantly urged toward its upper position (Fig. 2) by means of a torsional spring 63. From a consideration of Figure 2, it will be apparent that when the member 61 is in its upper position the slidable clutch member 57 will be in engagement with the member 56, while whenever the member 61 is in its lower position, the clutch will be disengaged. Thus, normally, the clutch will be engaged when the nozzle is removed from the hook member and will be disengaged when the nozzle is replaced on the hook member.

In the operation of the device as thus far described, it will be apparent that when the hook member is released and assumes its upper position, the clutch will be engaged and motion will be transmitted from the dispensing apparatus to the pinion 19, causing the latter to rotate and to move the carriage 16 toward the right (Fig. 1) by an amount proportional to the quantity of liquid dispensed. The movement of the carriage 16 will cause a corresponding movement of the pivoted member 27, which in turn will cause a movement of the carriage 21 which will be proportional to the product of quantity times unit price. This result ensues for the reason that, the position of the roller 35 having been adjusted vertically in accordance with the unit price of the commodity being dispensed, the movement of the carriage 21 will be dependent upon, and proportioned to, the distance of the roller 35 above the pivot 28. Thus it will be seen that the mathematical principle upon which the operation of the device depends is that, if two parallel straight lines are intersected by two or more transverse straight lines that pass through a common point, the corresponding segments of said parallel lines are proportional to their respective distances from said point.

In order to make visible the values registered by the movements of the carriages 16 and 21, respectively, the following mechanism is provided. A translucent disc 64 is mounted upon the sleeve 37 which is formed integral with the pinion 24, and a similar translucent disc 65 of slightly smaller diameter is secured upon the shaft 20 by means of a retaining member 66. About the periphery of the disc 64 there are arranged consecutive numerals denoting the total price to be paid. Similarly arranged on the periphery of the disc 65 are numerals denoting the quantity of goods dispensed. Means are provided for projecting images of the respective values indicated by the discs 64 and 65 upon suitable screens visible from the exterior of the casing 15. Thus, there is provided a light source such as an incandescent lamp 67 (Fig. 5) enclosed within a suitable casing 68 disposed at the desired location within the main casing 15. The light source may be provided with a reflector 69 and concentrator 70, the latter being adapted to direct a beam of light through the peripheries of the respective discs 64 and 65 and into a total reflecting prism 71. From the prism 71 the beams as modified by the numerals carried by the discs 64 and 65 are reflected through a projecting lens device 72 onto a mirror 73 (Figs. 2 and 3) and thence to their respective screens or windows 74 and 75 (Fig. 4) in the casing 15, said screens being composed of suitable translucent screen material, such as frosted glass. The numbers carried by the disc 64, may, for convenience, be arranged to indicate dollars and cents, the value of each number differing from its predecessor by one cent. The numbers carried by the disc 65 may conveniently be arranged to indicate gallons and fractions of gallons, each number differing from its predecessor by one-tenth of a gallon, or other suitable fraction. The windows 74 and 75 may be provided with suitable pointers 76 and 77 to indicate the exact quantity of liquid dispensed and the exact total price to be paid.

In order that the customer may be apprised of the unit price of the commodity being dispensed, means are provided for furnishing a visible indication of this value. To this end, an extension of the shaft 47 is provided with numbered drums 78, 79 and 80 for indicating tenths, units and tens of cents, respectively. The drum 78 is preferably secured upon the shaft 47 while the drums 79 and 80 are secured to collars rotatably mounted upon the shaft 47, the driving means connecting the several drums being of any suitable type such as is common in instruments of the odometer type. The several drums are visible through the windows 81 (Fig. 4). Thus, a visible indication of the unit price of the commodity dispensed is furnished at the same time that the roller 35 associated with carriage 21 is adjusted in accordance with such unit price. That is to say, by a single operation the roller 35 may be adjusted and the drums 78, 79 and 80 turned to indicate the desired unit price, the operator thus being able to insure the correct adjustment of the roller 35 by watching the progress of the several drums through the windows 81. It is necessary, of course, to so relate the diameter of the drums to the characteristics of the computing mechanism that the drums will accurately reflect the condition of the latter.

As previously explained, mechanism is provided whereby the clutch consisting of the members 56 and 57 is automatically disengaged when the nozzle of the dispensing hose is placed upon the hook member 61. As soon as the clutch is disengaged, the carriages 16 and 21 and the pivoted member 27 return to their zero or initial position under the compulsion of the springs 29 and 36. If desired, a spring 82 (Fig. 2) may be provided for assisting the carriage 16 in this return movement. In order to prevent the clutch 56, 57 from being again engaged before the return movement of the several members has been completed, there is provided a locking lever 83, pivoted as at 84, which is adapted, under the compulsion of a spring 85, to engage the groove 58 of the sliding clutch member 57 when the latter is in its disengaged position, thus preventing engagement of the clutch. When the carriage 16 returns to its zero position, which position is defined by a stop member 86, it engages the lower end of the lever 83 and pivots the latter out of engagement with the sliding clutch member 57, thus enabling the clutch to be engaged whenever the hook member 61 is again released by removing the hose nozzle therefrom.

The mechanism illustrated in Figures 1–7, inclusive, has now been completely described and its operation will be readily apparent. Assuming that the unit price of gasoline or other commodity being dispensed has been fixed at 17.5 cents per gallon, and the mechanism adjusted accordingly, as illustrated in Figure 4, and assuming that it is desired to dispense five gallons of liquid, the operator will remove the nozzle of the dispensing hose from the hook member 61, thus releasing the latter and permitting the clutch 56, 57 to engage. When the hose nozzle has been placed in position with respect to the vessel to be filled, the pump mechanism is started. As the liquid is dispensed by the pump, the computing mechanism is actuated in the manner previously described until the figures 5%₀ appear in the window 75 exactly opposite the pointer 77, when the operator will interrupt the operation of the dispensing mechanism. In the window 74 will appear the figures 0.87 just above the pointer 76 and 0.88 just below the pointer, indicating that the value of the liquid dispensed is 87.5 cents. According to the usual custom, the purchaser will pay the higher figure, namely 88 cents.

Figure 11:
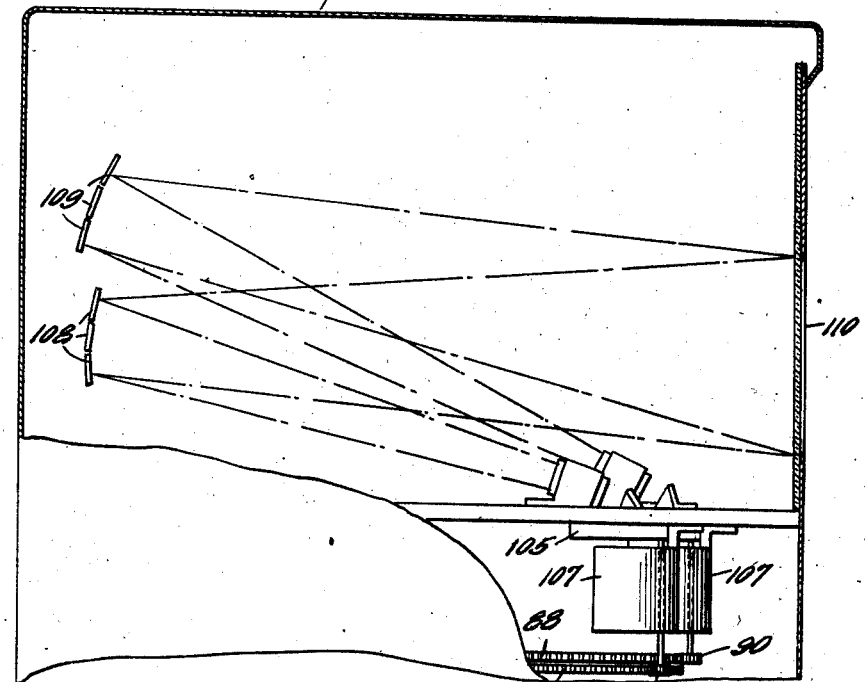
Figure 11 is a plan view of a portion of the mechanism of Figure 10.

If desired, the form of the indicia bearing movable members may be modified, as illustrated in Figures 10, 11 and 12, so as to provide for a step by step movement of the visible figures. In place of the translucent discs 65 and 64, the shaft 20 and sleeve 37 may be provided, respectively, with large gears 87 and 88 which will thus be rotated, respectively, in proportion to the quantity of liquid delivered and the total price thereof. The gears 87 and 88 serve, in turn, to rotate pinions 89 and 90, respectively, each of which serves to drive means for indicating visually the quantity of goods dispensed or the total price thereof, as the case may be.

Figure 12 illustrates means for indicating the total price of the goods dispensed according to the present modification. The pinion 89 secured on a shaft 102 serves to drive a numbered translucent disc 91, secured on the same shaft, for indicating cents. Also secured on the shaft 102 is a disc 92 having a single tooth 93. Upon a shaft 94 suitably spaced from the shaft 102 is secured a disc 95 which is provided with ten spaced pairs of teeth 96 for cooperating with the single tooth of the disc 92. The shaft 94 also carries a translucent disc 97 numbered to indicate tens of cents, and also carries a disc 98 provided with a single tooth 99. Upon another shaft 100, suitably spaced from the shaft 94, are secured a translucent disc 101, adapted to indicate dollars, and a toothed disc 103 corresponding to the disc 95 secured upon the shaft 94. From the foregoing description it will be apparent that each successive translucent disc, progressing from right to left, will rotate at one-tenth of the speed of the preceding disc, thus establishing the correct relationship between the several discs for indicating the dollars and cents corresponding to the quantity of goods dispensed.

The organization just described is preferably made quite small, the numerals being provided on the translucent discs by means of photographic reduction or other suitable process. A second organization, similar to that just described, is provided for indicating the quantity of liquid dispensed in gallons and fractions of a gallon. Such organization is indicated generally by the numeral 104 (Fig. 10), the organization for indicating total price being designated generally by the numeral 105.

Each of the devices 104 and 105 is enclosed in a suitable casing provided with small windows 106 in front and back of the several translucent discs. Behind each device is placed a light source 107 for projecting the values indicated according to an optical system such as that previously described. In the present case, however, the two values are preferably reflected from separate sets of small mirrors 108 and 109 (Fig. 11), and are projected onto separate small screens 110 and 111 (Fig. 13). As indicated in Figures 4 and 13, the face of the casing 15 is preferably provided with suitable legends for identifying the values appearing on the several screens.

In some instances it is desirable to provide means for automatically interrupting the operation of the dispensing apparatus when a predetermined quantity of liquid has been dispensed or when liquid of a predetermined value has been dispensed. Mechanism for accomplishing this result is illustrated in Figures 8 and 9, as follows. An adjustable stop 112, carrying contact members 113a, 113b and 114a, 114b is mounted upon an adjusting screw 115 suitably journalled and extending longitudinally between the carriages 16 and 21, the stop 112 being adjustable into such position that one or both sets of contact members may be actuated by the movement of their associated carriages 16 or 21, as the case may be.

The adjusting screw 115 is provided at its end with a bevel gear 116, which meshes with another bevel gear 117 secured upon a sleeve 121, which is rotatable on a shaft 118, the latter being journalled in frame members 119 and 120, disposed within the casing 15. The sleeve 121 is provided at its outer end with a gear 122, which meshes with a gear 123 secured upon the shaft 124 of a crank 125. Thus by rotating the crank 125 the stop member 112 may be adjusted longitudinally of the screw 115. The stop member preferably slidably engages the web 126 (Fig. 2) formed between the guides 17 and 22, thus preventing the stop member from rotating with the screw 115.

In order to ensure that the stop 112 will be adjusted to conform to an exact quantity of liquid or sum of money, the screw 115 is provided with a notched disc 200, the spaced notches of which are yieldingly engaged, successively, by a spring finger 201. The notches of the disc 200 are so spaced about its periphery that each notch corresponds exactly to a predetermined part of a gallon, or a predetermined unit of money, for example, one cent.

On the sleeve 121 is provided a totalizing device similar to that provided for indicating the unit price, as described above, and consisting of drums 127, 128 and 129, for indicating "gallons wanted". That is, the drums will be driven, during the operation of adjusting the stop 112, so as to indicate in the window 130 (Fig. 13), the number of gallons for which the stop 112 has been adjusted, and will thus not only aid the operator in making such adjustment, but will apprise the customer that it has been accurately made in accordance with his request.

The shaft 118 is provided with another similar totalizer comprising drums 131, 132 and 133, for indicating "amount wanted", i. e., the amount of money which the customer desires to pay. Shaft 118 is connected with the crank 125 by means of gears 134 and 135, and the rotation of the crank to adjust the stop 112 thus serves also to register, by means of the drums 131, 132 and 133, the amount which the customer wishes to pay, or the total price corresponding to the number of gallons wanted, as the case may be. This amount will be visible through the windows 130' (Fig. 13).

In order to avoid confusion, means may be provided for obscuring one of the two groups of windows, so that if the customer orders a certain number of gallons, the windows 130 will be open and the windows 130' closed, while if he orders a certain total value of gasoline, the windows 130' may be opened and the windows 130 closed. Thus, a rotatable screen 139 (Fig. 9) having windows 136 and 137 disposed in quadrature, is mounted in a suitable opening in the casing 15, and may be operated by a handle 138 (Fig. 13).

The electrical circuits involved in the present modified form of the invention are illustrated in Figure 11. The supply mains are indicated by the numeral 140, 141, a motor for operating the pump mechanism at 142, and a conductor 143 connects the motor to the main 140. The other side of the motor 142 is connected to the main 141 through conductor 144, switch 145, conductor 146, switch 147 and conductor 148. A resistance 149 is connected in shunt with the switch 147.

The switch 147 is under control of a relay 150 which in turn is controlled by the contact member 113b and 114b. Thus the circuit through the relay 150 comprises conductor 151, contact member 114b, a fixed contact 152 associated with the stop member 112, contact member 113b, conductor 153, relay 150, and conductor 154. It will be obvious that if contact member 113b or 114b is actuated, breaking the circuit through the relay 150, the switch 147 will open, breaking the shunt circuit around the resistance 149, and lowering the speed of the motor.

The switch 145 is similarly under control of a relay 155, which is controlled by contact members 113a and 114a. Thus, if either contact member 113a or 114a is actuated, the relay 155 will be de-energized, permitting the switch 145 to open the motor circuit and stopping the motor.

The contact members 113b and 114b, which govern the slowing of the motor 142, are placed in advance of the contact members 113a and 114a, with respect to the cariages 21 and 16, respectively (as illustrated in Fig. 8) so that one of them will be actuated first, to slow down the pump, after which one of the contact members 113a, 114a will be actuated to stop the pump.

Except in unusual circumstances, one of the carriages 16 and 21 will always travel somewhat faster than the other. Thus, in the device as illustrated herein, and particularly because of the relative vertical positions of the rollers 26 and 35, it is apparent that the carriage 16 will move faster than carriage 21. Therefore, when the interruption of the motor circuit is to be dependent upon the value of goods delivered, it is necessary to shunt the contact members 114a and 114b, so that their actuation by the carriage 16 will not affect the operating circuit. This may be accomplished by the means, illustrated in Figure 9. The shunt around contact member 114a comprises a conductor 160, spring contact switch 161, and conductor 162. The shunt circuit for contact member 114b comprises conductor 163, spring contact switch 164, and conductor 165. When the rotatable scren 135 is in the position illustrated in Figure 9, wherein the window 136 exposes the device for indicating the money value of goods wanted, pins 166 and 167, carried by the screen 135, will maintain the spring contact switches 161 and 164 closed, shunting the contact members 114a and 114b, respectively. However, when screen 135 is shifted so as to move the window 137 into register with the device for indicating the number of gallons wanted, the pins 166 and 167 will release the spring contact switches 161 and 164, which will open, thus breaking their respective shunt circuits and rendering the contact members 114a, 114b effective to control the motor circuit as previously described.

It will be obvious that many variations from the above described mechanism may be employed without departing from the scope of the invention. Thus, in place of rack and pinion means for moving the respective carriages I might employ flexible band and drum devices. The rollers 26 and 35 may be replaced by means having sliding engagement with the respective arms or tracks of the pivoted member 27. Changes may be made in the optical systems employed, and in the form of the indicia bearing members. The automatic stop feature may be employed or not, as desired. Many other modifications will suggest themselves to one skilled in the art to which this invention pertains.

A device constructed according to the present invention may be employed for multiplying or dividing single factors by single factors, or groups of factors by a single factor or group of factors, by means of succesive operations in both directions, with suitable adjustments of the roller 35 betwen operatic s. Other and varied uses of the described device will occur to one skilled in the art.

Having thus described the invention, what is claimed as new and desired to be secured by Letters Patent is:

1. In a device for computing a result from two factors, a member adapted for rectilinear movement proportional to c e of the factors to be computed, a second member adapted for rectilinear movement proportional to the result of a computation, and means for communicating motion from said first member to said second member in a ratio proportional to the second factor, said means comprising a member mounted for pivotal movement, and means carried by each of said rectilinearly movable members and engaging said pivoted member.

2. In a device for computing a result from two factors, a member adapted for rectilinear movement proportional to one of the factors to be computed, a second member adapted for rectilinear movement proportional to the result of a computation, and means for communicating motion from said first member to said second member in a ratio proportional to the second factor, said means comprising a member mounted for pivotal movement, and means carried by each of said rectilinearly movable members and urged into constant bearing engagement with said pivoted member.

3. In a device for computing a result from two factors, a member adapted for rectilinear movement proportional to one of the factors to be computed, a second member adapted for rectilinear movement proportional to the result of a computation, and means for communicating motion from said first member to said second member in a ratio proportional to the second factor, said means comprising a member mounted for pivotal movement, means carried by said first movable member and engaging said pivoted member, and means carried by said second movable member and engaging said pivoted member, said last mentioned means being adjustable in accordance with variations in said second factor.

4. In a device for computing a result from two factors, a member adapted for rectilinear movement proportional to one of the factors to be computed, a second member adapted for rectilinear movement proportional to the result of a computation, and means connecting said members, said connecting means comprising a member adjustable in accordance with variations in said second factor.

5. In a device for computing a result from two factors, a member adapted for rectilinear movement proportional to one of the factors to be computed, a second member adapted for rectilinear movement parallel to said first member and proportional to the result of a computation, and a pivoted member engaging said first movable member in a plane displaced from said pivot, and engaging said second movable member in a plane parallel to and displaced from said first plane.

6. In a device for computing a result from two factors, a carriage adapted for horizontal rectilinear movement in accordance with one of the factors to be computed, a second carriage adapted for rectilinear movement parallel to the movement of said first carriage, a member mounted for oscillatory movement about a horizontal pivot transverse to the direction of movement of said carriages, and means associated with each of said carriages and bearing against said pivoted member.

7. In a device for computing a result from two factors, a carriage adapted for horizontal rectilinear movement in accordance with one of the factors to be computed, a second carriage adapted for rectilinear movement parallel to the movement of said first carriage, a member mounted for oscillatory movement about a horizontal pivot transverse to the direction of movement of said carriages, means carried by said first carriage for engaging said pivoted member, and means carried by said second carriage for engaging said pivoted member, said last mentioned means being vertically adjustable in accordance with variations in said second factor.

8. In a device for computing a result from two factors, a carriage adapted for horizontal rectilinear movement in accordance with one of the factors to be computed, a second carriage adapted for rectilinear movement parallel to the movement of said first carriage, a member mounted for oscillatory movement about a horizontal pivot transverse to the direction of movement of said carriage, a roller carried by said first carriage for engaging a track formed on said pivoted member, and a roller carried by said second carriage for engaging a second track formed on said pivoted member.

9. In a device for computing a result from two factors, a carriage adapted for horizontal rectilinear movement in accordance with one of the factors to be computed, a second carriage adapted for rectilinear movement parallel to the movement of said first carriage, a member mounted for oscillatory movement about a horizontal pivot transverse to the direction of movement of said carriage, a roller carried by said first carriage for engaging a track formed on said pivoted member, and a roller carried by said second carriage for engaging a second track formed on said pivoted member, said last mentioned roller being vertically adjustable with respect to said second carriage in accordance with variations in said second factor.

10. In a device according to claim 1, a rack associated with each of said rectilinearly movable members, a pinion engaging each said rack, and indicia bearing means associated with each said pinion and controlled thereby to indicate visually, respectively, a factor and the product of a computation.

11. In a device for computing a result from two factors, a member adapted for rectilinear movement proportional to one of the factors to be computed, a second member adapted for rectilinear movement proportional to the product of a computation, means connecting said members and including an adjustable member, means for adjusting the position of said adjustable member in accordance with variations in said second factor, and means associated with and controlled by said adjusting means for furnishing a visual indication of the value of said second factor.

12. In a device of the character described, a carriage adapted for rectilinear movement proportional to the result of a computation, a guide way associated with said carriage, a member adjustable along said guide way, an adjusting screw associated with said adjustable member and means for rotating said screw to vary the position of said adjustable member in accordance with variations in one of the factors to be computed.

13. In a device of the character described, a carriage adapted for rectilinear movement proportional to the result of a computation, a guide way associated with said carriage, a member adjustable along said guide way, an adjusting screw associated with said adjustable member, means for rotating said screw to vary the position of said adjustable member in accordance with variations in one of the factors to be computed, and means associated with said last mentioned means for indicating visually the value of said factor.

14. In a device for dispensing a commodity and computing the total price thereof, a carriage movable in proportion to the quantity of goods dispensed, a second carriage movable in proportion to the total price of the goods dispensed, means connecting said carriages and including a member adjustable in accordance with the unit price of the commodity dispensed, electrical means for operating said dispensing device, an electrical circuit for controlling said operation, and switch means included in said circuit and adapted to be actuated by the movements of said carriages for interrupting said operation at a predetermined point.

15. In a device according to claim 13, a contact switch adapted to be actuated by the movement of said first carriage, a second contact switch adapted to be actuated by said second carriage, and means for adjusting the position of said switches with respect to the paths of said carriages.

16. In a device according to claim 13, a contact switch adapted to be actuated by the movement of said first carriage, a second contact switch adapted to be actuated by said second carriage, means for adjusting the position of said switches with respect to the paths of said carriages, and means associated with said switch adjusting means for indicating visually the numerical value of the adjustment effected.

17. In a device according to claim 13, a contact switch adapted to be actuated by the movement of said first carriage, a second contact switch adapted to be actuated by said second carriage, means for adjusting the position of said switches with respect to the paths of said carriages, and means for shunting said first switch to prevent the interruption of the operation of the device by actuation of said switch.

18. In a device according to claim 13, an operating circuit including a motor, a shunted resistance in said circuit, a control circuit, and a pair of switches adapted to be actuated by each said carriage and included in said control circuit, one switch of each said pair being adapted to open the shunt circuit around said resistance in said operating circuit when said switch is actuated by its associated carriage, the second switch of each pair being adapted to open said operating circuit when said switch is actuated by its associated carriage.

PIERRE SORDOILLET.